United States Patent
Heidt

(10) Patent No.: US 11,489,658 B2
(45) Date of Patent: Nov. 1, 2022

(54) EXECUTING CRYPTOGRAPHIC OPERATIONS IN A CONTROL UNIT OF A VEHICLE

(71) Applicant: Infineon Technologies AG, Neubiberg (DE)

(72) Inventor: Laurent Heidt, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 313 days.

(21) Appl. No.: 16/567,780

(22) Filed: Sep. 11, 2019

(65) Prior Publication Data

US 2020/0169380 A1    May 28, 2020

(30) Foreign Application Priority Data

Nov. 28, 2018  (DE) .......................... 102018130177.4

(51) Int. Cl.
    *G06F 21/56*    (2013.01)
    *H04L 9/00*     (2022.01)

(52) U.S. Cl.
    CPC .............. *H04L 9/002* (2013.01); *G06F 21/56* (2013.01); *G06F 2221/032* (2013.01)

(58) Field of Classification Search
    CPC ........... H04L 9/002–005; G06F 21/755; G06F 21/75; G06F 21/57; G06F 21/577
    See application file for complete search history.

(56) References Cited

U.S. PATENT DOCUMENTS

| | | | |
|---|---|---|---|
| 8,639,922 B2* | 1/2014 | Phatak | H04L 63/1441 713/156 |
| 9,729,310 B2* | 8/2017 | Hars | H04L 9/0631 |
| 10,469,530 B2* | 11/2019 | Bharrat | H04L 63/1458 |
| 10,542,039 B2* | 1/2020 | Xu | H04L 43/0882 |
| 10,554,241 B2* | 2/2020 | Jain | H04L 9/002 |
| 10,664,413 B2* | 5/2020 | Fons | G06F 12/1408 |
| 10,680,797 B2* | 6/2020 | Kose | H03K 19/0019 |
| 10,705,848 B2* | 7/2020 | Vougioukas | G06F 9/3806 |
| 11,171,772 B2* | 11/2021 | Satpathy | G09C 1/00 |
| 2012/0159187 A1* | 6/2012 | Liu | G06F 21/755 713/189 |
| 2015/0324576 A1 | 11/2015 | Quirant et al. | |
| 2016/0277178 A1 | 9/2016 | Dubeuf et al. | |
| 2018/0026782 A1* | 1/2018 | Xiao | G06F 21/755 713/189 |

FOREIGN PATENT DOCUMENTS

EP    2996277 A1    3/2016
EP    3217307 B1    11/2018

* cited by examiner

*Primary Examiner* — Zachary A. Davis
(74) *Attorney, Agent, or Firm* — Banner & Witcoff Ltd.

(57) ABSTRACT

A device, method, or computer program product for conducting a cryptographic operation in a vehicle is disclosed herein. The device is arranged to receive key data and input data, and to conduct a cryptographic computation of the input data to output data using the key data. The cryptographic computation is conducted with or without side channel attack counter measures, which are toggled based on the key data or based on a control input.

14 Claims, 1 Drawing Sheet

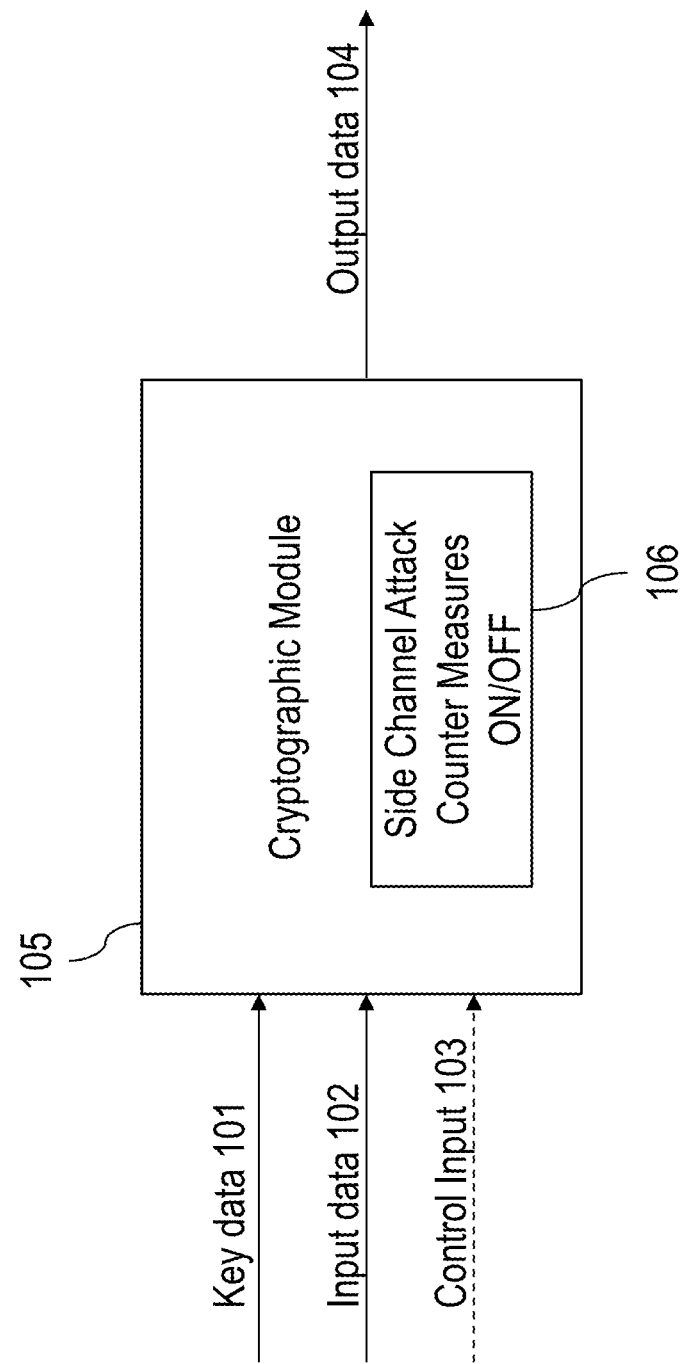

EXECUTING CRYPTOGRAPHIC OPERATIONS IN A CONTROL UNIT OF A VEHICLE

TECHNICAL FIELD

Embodiments of the present disclosure relate to the execution of cryptographic operations in a vehicle, in particular a device, e.g., a control unit of the vehicle.

BACKGROUND

In computer security, a side channel attack is an attack based on information gained from the implementation of a computer system. Timing information, power consumption, electromagnetic leaks or even sound can provide an extra source of information, which can be exploited. Various counter measures are known to impede side channel attacks. As side-channel attacks rely on the relationship between information emitted (leaked) through a side channel and the secret data, countermeasures may in particular fall into two main categories: (1) eliminate or reduce the release of such information and (2) eliminate the relationship between the leaked information and the secret data, that is, make the leaked information unrelated, or rather uncorrelated, to the secret data, typically through some form of randomization of the ciphertext that transforms the data in a way that can be undone after the cryptographic operation (e.g., decryption) is completed.

SUMMARY

The objective is to improve existing solutions and in particular provide an efficient solution to increase the robustness against side-channel attacks.

This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A device is provided for conducting a cryptographic operation in a vehicle, wherein the device is arranged to receive key data, to receive input data, and to conduct a cryptographic computation of the input data to output data using the key data, wherein the cryptographic computation is conducted with or without side channel attack counter measures, wherein the side channel attack counter measures are toggled based on the key data and/or based on a control input.

Hence, the side channel attack counter measures can be switched on or off based on the key data, e.g., the key, a key property and/or based on a control input, which may comprise a signal from an external unit or status information of the device. This approach bears a high degree of flexibility for cryptographic operations conducted with or without counter measures. The device may be a cryptographic module comprising hardware and/or software portions. The device may in particular be a symmetric cryptographic unit.

According to an embodiment, the key data comprises a symmetric key.

According to an embodiment, the cryptographic computation comprises at least one of the following: an encryption; and a decryption.

According to an embodiment, the key data comprises a property, wherein the side channel attack counter measures are toggled based on the property.

According to an embodiment, the property comprises at least one of the following: a computation mode for this key, i.e. whether this key should be used with or without counter measures; lifespan information for this key; and an information that allows determining the computation mode.

According to an embodiment, the control input is received at the device or it is generated by the device.

According to an embodiment, the control input is used to override the property of the key.

According to an embodiment, the device comprises a component for conducting the side channel attack counter measures.

According to an embodiment, the device is an electronic control unit of a vehicle or part of such electronic control unit.

Also, a method is provided for conducting a cryptographic operation in a vehicle, comprising: receiving key data, receiving input data, and conducting a cryptographic computation of the input data into output data using the key data, wherein the cryptographic computation is conducted with or without side channel attack counter measures, wherein the side channel attack counter measures are toggled based on the key data and/or based on a control input.

Further, a system is suggested for conducting a cryptographic operation in a vehicle, comprising: means for receiving key data, means for receiving input data, and means for conducting a cryptographic computation of the input data to output data using the key data, wherein the cryptographic computation is conducted with or without side channel attack counter measures, wherein the side channel attack counter measures are toggled based on the key data and/or based on a control input.

Further, a computer program product is suggested, which is directly loadable into a memory of a digital processing device, comprising software code portions for performing the steps of the method as described herein.

BRIEF DESCRIPTION OF THE FIGURE

Embodiments are shown and illustrated with reference to the drawing. The drawing serves to illustrate the basic principle, so that only aspects necessary for understanding the basic principle are illustrated. The drawing is not to scale.

FIG. 1 shows a schematic block diagram visualizing exemplary use case scenarios for a cryptographic module that may or may not use side channel attack counter measures.

DETAILED DESCRIPTION

An implementation of a counter measure to avoid successful side channel attacks against a symmetric cryptography hardware part may significantly reduce the overall processing performance. In other words, counter measures against side channel attacks require processing time, which deteriorates the performance. In the automotive domain, the performance may be a critical requirement and especially in some scenarios such deterioration of the performance shall be avoided.

On the other hand, there is still an increasing urge especially in the automotive domain to implement features that are suitable to hinder side channel attacks.

It is noted that the approach described herein with regard to the automotive scenario may be applicable in other areas as well.

Especially in the automotive domain, symmetric keys may have a long life span. Such long-lasting keys may be stored, e.g., in flash memory, and they are intended to be used for a long time (e.g., typically 5 to 10 years or even longer) and/or for processing a predetermined amount of data before being changed. Such keys may in particular be subject to side channel attacks. Hence, it is a basic motivation to impede side channel attacks from being successful.

The risk of successful side channel attacks may be reduced by so-called counter measures. There are many types of counter-measures known in the art. In one example, a cryptographic operation may comprise one or more counter measure like using masked data when executing a step of the cryptographic operation.

Examples shown herein in particular propose a flexible module (comprising hardware and/or software) that supports a fast computation mode and a slow computation mode. The fast computation mode may not include specific counter measures, whereas the slow computation mode may include counter measures. The selection of the computation mode may depend on at least one of the following: (predetermined) constraints; a particular use-case scenario; and a symmetric key or any attribute and/or property associated with the symmetric key (e.g., life-span).

Example: Computation Mode Depending on Key Properties

At the time a key is generated, its purpose and life span (i.e. the duration of the key being valid) may already be known. The key may be associated with at least one property, e.g., a type of service for which the key is being used. A property indicating the computation mode for this key may be provided. This property may directly or indirectly indicate the computation mode. The computation mode may be either a computation mode with counter measures or a computation mode without counter measures.

The property may be a flag or any (coded) information that indicates how the computation mode is to be set. As an alternative, the property may be any kind of information that allows indirectly determining how the computation mode is to be set. For example, the property may be a duration of the life span of the key; based on this duration, a hardware module may set the computation mode (e.g., if the life span is longer than a predetermined threshold, the computation mode with counter measures is set otherwise the computation mode without counter measures is set).

This approach bears the advantage that the user does not have to specify the computation mode each time the key is being used. Also, the approach avoids any mistake to use the key in combination with the wrong computation mode, e.g., the key that requires the computation mode with counter measures being by accident used in the wrong computation mode without counter measures.

Hence, the hardware module (e.g., a symmetric cryptographic module) may select the computation mode based on this particular key property.

Example: Computation Mode Set for the Cryptographic Module

The cryptographic module may be a symmetric cryptographic unit. It may comprise software and/or hardware portions.

Instead of or in addition to the property that is associated with the key indicating the computation mode, the cryptographic module may be set to either one of the computation modes (i.e., with or without counter measures).

This approach may be favorable in case the number of properties of a key are to be reduced and/or in case there is no property available for a key that indicates or allows deriving the computation mode. For example, particular hardware and/or software implementations may not support such property stored in combination with a key.

Another advantage for this approach is that a user, customer or even a hardware or software portion may decide about the computation mode of the cryptographic module based on at least one of the following: a state of at least one electronic control unit (ECU), and a lifecycle of the ECU, e.g., startup, runtime, shutdown, hardware production, OEM production or development phase.

Hence, any hardware and/or software may be arranged to select the computation mode of the cryptographic module. Such selection could be done, e.g., once after a reset, or for every computation sent to the cryptographic module.

Exemplary Use Cases

FIG. 1 shows a schematic block diagram visualizing exemplary use case scenarios. A cryptographic module 105 may be an electronic control unit (ECU) of a vehicle or it may be part of such ECU. The cryptographic module 105 may be or comprise a symmetric cryptographic unit which may further comprise hardware and/or software portions. The cryptographic module 105 may be arranged to conduct symmetric cryptographic operations based on a key.

The cryptographic module 105 comprises a component 106 which is able to conduct side channel attack counter measures. The component 106 can be switched on or off depending on predefined conditions.

The cryptographic module 105 receives key data 101, input data 102 and (optional, as indicated by the dashed line) a control input 103. The cryptographic module 105 conducts symmetric cryptographic operations with or without counter measures, wherein such counter measures may be supplied and/or (de-)activated via the component 106. The cryptographic module 105 supplies output data 104. The cryptographic module 105 provides a cryptographic computation comprising, e.g., an encryption or a decryption. In an example, the output data 104 are encrypted input data 102. It is noted that according to the example described herein the cryptographic module 105 conducts an encryption. However, the cryptographic module 105 may conduct any other cryptographic computation such as a decryption; in such exemplary scenario, the cryptographic module 105 would supply decrypted input data 102 as output data 104.

The key data 101 may comprise a (symmetric) key and optionally the aforementioned property indicating the computation mode for this key. Based on this property, the counter measures for cryptographic operations using this key are either switched on or off. For example, the property may indicate that the actual key has a long lifespan and therefore counter measures should be used to hinder side channel attacks. The property may, e.g., be a flag that is set to "1" thereby indicating to the cryptographic module 105 that counter measured should be used. On the other hand, the flag may be set to "0" indicating that no counter measures should be used.

As an alternative, the key data 101 comprises the key only (i.e. no property that indicates the computation mode); and the decision whether this key is used in combination with counter measures or without counter measures is made based on additional information. This additional information may be supplied via the control input 103. Hence, the component 106 may be switched on or off based on a signal that is received as or at the control input 103. In addition, the cryptographic module 105 itself, e.g., based on internal status information, may trigger the counter measures on or off or it may even override the information obtained by the control input 103 or by the key property (if applicable).

It is noted that the key data 101 may comprise the property, the control input 103, or any internal status eligible to toggle counter measures. In such case, it can be prioritized whether the property, the control input 103, or the internal status switches the counter measures on or off, for example by storing the property, the control input 103, or the internal status according to priority.

Hence, the solution presented allows for a high degree of flexibility when triggering the side channel attack counter measures on or off.

Potential Applications and Further Embodiments

The approach presented may in particular be applied in a control unit of a vehicle. A decision whether or not to enable the counter measures may in particular depend on a lifespan of a (symmetric) key. In this regard, the property of the key may indicate the lifespan (or any information that relates to the lifespan) of the key and the cryptographic module may decide based on this lifespan whether or not to trigger counter measures. The counter measures may even be triggered flexibly, i.e. depending on how long the key is used (or still to be used).

In addition, a state change of any module (e.g., the cryptographic module 105 or an external module, which might be indicated via the control input 103) may indicate that (e.g., due to an emergency situation) the counter measures are always turned on or off (depending on the respective situation). For example, if performance is critical, the counter measures may be temporarily switched off, even if the property of the key stipulated the counter measures to be active.

It is noted that the cryptographic module 105 may be any module without any restriction to automotive scenarios. Hence, solutions described herein may be applicable for any kind of cryptographic module, which is arranged to receive key data, to receive input data, and to conduct a cryptographic computation, e.g., an encryption or a decryption of the input data to output data using the key data, wherein the cryptographic computation is conducted with or without side channel attack counter measures, wherein the side channel attack counter measures are toggled based on the key data or based on a control input.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A cryptographic module for conducting a cryptographic operation in a vehicle, comprising:
    an input arranged to receive key data and input data; and
    processing circuitry configured to conduct a cryptographic computation of the input data into output data using the key data, wherein the cryptographic computation is conducted with or without side channel attack counter measures, which are toggled based on the key data, and the key data comprises lifespan information for a cryptographic key.

2. The cryptographic module according to claim 1, wherein the cryptographic key is a symmetric key.

3. The cryptographic module according to claim 1, wherein the cryptographic computation comprises an encryption or a decryption.

4. The cryptographic module according to claim 1, wherein the side channel attack counter measures are toggled based on a control input, which is received at the input.

5. The cryptographic module according to claim 1, wherein the side channel attack counter measures are toggled based on a control input, which is generated by the cryptographic module.

6. The cryptographic module according to claim 1, wherein the side channel attack counter measures are toggled based on a control input, which is used to override the key data.

7. The cryptographic module according to claim 1, further comprising:
    a component configured to conduct the side channel attack counter measures.

8. The cryptographic module according to claim 1, wherein the cryptographic module is an electronic control unit of a vehicle.

9. The cryptographic module according to claim 1, wherein the cryptographic module is part of an electronic control unit.

10. A method for conducting a cryptographic operation in a vehicle, comprising:
    receiving key data at a device;
    receiving input data at the device; and
    conducting a cryptographic computation of the input data into output data using the key data,
    wherein the cryptographic computation is conducted with or without side channel attack counter measures, which are toggled based on the key data, and the key data comprises lifespan information for a cryptographic key.

11. The method according to claim 10, wherein the side channel attack counter measures are toggled based on a control input, which is received at the device.

12. The method according to claim 10, wherein the side channel attack counter measures are toggled based on a control input, which is generated by the device.

13. A non-transitory computer-readable medium comprising instructions that when executed by a digital processor cause the digital processor to perform the method according to claim 10.

14. A system for conducting a cryptographic operation in a vehicle, comprising:
    means for receiving key data;
    means for receiving input data; and
    means for conducting a cryptographic computation of the input data into output data using the key data,
    wherein the cryptographic computation is conducted with or without side channel attack counter measures, which are toggled based on the key data, and the key data comprises lifespan information for a cryptographic key.

* * * * *